(12) United States Patent
Wang

(10) Patent No.: US 7,566,506 B2
(45) Date of Patent: Jul. 28, 2009

(54) MAGNETIC BODY

(76) Inventor: Jen-Chieh Wang, 2nd Fl., No. 31-1, Alley 452, Ta-Yih Rd., Taipei (TW)

( * ) Notice: Subject to any disclaimer, the term of this patent is extended or adjusted under 35 U.S.C. 154(b) by 698 days.

(21) Appl. No.: 11/037,350

(22) Filed: Jan. 19, 2005

(65) Prior Publication Data

US 2006/0159961 A1   Jul. 20, 2006

(51) Int. Cl.
*B32B 15/00*   (2006.01)
(52) U.S. Cl. .................. 428/692.1; 428/693.1; 428/800; 428/817; 442/247
(58) Field of Classification Search ................. 428/800, 428/817; 442/247
See application file for complete search history.

(56) References Cited

U.S. PATENT DOCUMENTS 6,274,040 B1 *   8/2001   Mitsumori et al. .......... 210/243
6,478,966 B2 *   11/2002  Zhou et al. .................. 210/638
6,924,018 B2 *   8/2005   Ozawa et al. ............... 428/64.1
2004/0062947 A1 *  4/2004  Lamansky et al. .......... 428/690
2007/0237983 A1 * 10/2007  Li et al. ...................... 428/690

* cited by examiner

*Primary Examiner*—D. Lawrence Tarazano
*Assistant Examiner*—Gary D Harris
(74) *Attorney, Agent, or Firm*—Rosenberg, Klein & Lee

(57) ABSTRACT

A magnetic body includes a plurality of laminated inner layers and an insulating enclosure fully enclosing the inner layers therein. The inner layers include a first or central metal layer, each one of upper and lower sides of which is sequentially provided with a first insulating layer, a second metal layer, a filter layer, a second insulating layer, a third metal layer, and a light-absorbing material layer. Each of the metal layers is negatively charged and formed by coating a specific high-temperature vaporized metal element on an entire surface of an insulating body. The filter layer is woven from an insulating material and has at least 144 millions of meshes per square inch. The light-absorbing material layer stores pre-absorbed light energy. The magnetic body with the above-described structure produces a radial magnetic field of force that provides enhanced magnetizing effect.

2 Claims, 2 Drawing Sheets

MAGNETIC BODY

FIELD OF THE INVENTION

The present invention relates to a novel magnetic body, and more particularly to a magnetic body having a plurality of laminated inner layers, including metal layers formed from conductive metal elements, insulating layers, finely mesh-structured filter layers, and light-absorbing material layers, to produce a radial magnetic field of force.

BACKGROUND OF THE INVENTION

It is known that magnetic field of force has been proven existed and widely used to magnetize various kinds of substances to change their molecular structure and physical properties. For example, when the magnetic field of force is used to magnetize water, the magnetic field of force is in a direction perpendicular to the direction of water flow, so that magnetic lines of the magnetic field of force repeatedly cut water flown therethrough to eventually change the molecular structure and physical properties of water, making the water taste better.

Currently, a permanent magnet or an electromagnet is used to produce the magnetic field of force, which is limited to two magnetic poles, namely, south (S) pole and north (N) pole, and has fixed acting direction and restricted acting range. Therefore, the permanent magnet or the electromagnet has only limited magnetic performance. When the magnetic field of force produced by the conventional permanent magnet or electromagnet is used to magnetize different substances, such as water, liquor, petroleum, etc., the magnetized substances have little or no change in their molecular structure and physical properties, indicating the conventional magnetic field of force has limited magnetizing range and effect.

SUMMARY OF THE INVENTION

A primary object of the present invention is to provide a magnetic body that produces a radial magnetic field of force, which has not fixed magnetic field direction and range, and accordingly, provides further enhanced magnetizing effect.

To achieve the above and other objects, the magnetic body of the present invention includes a plurality of laminated inner layers, including metal layers, insulating layers, filter layers, and light-absorbing material layers, and an insulating enclosure fully enclosing the laminated inner layers therein.

Each of the metal layers in the magnetic body of the present invention is formed by way of coating a specific high-temperature vaporized conductive metal element on an entire surface of an insulating body and is therefore negatively charged. And, more than two different types of metal elements are used to form more than two metal layers.

Since electric charges in the nature have radial force lines and fields, and a negatively charged force field has an inward direction while a positively charged force field has an outward direction, and most external substances, such as air, liquid, and solid bodies, are positively charged, the magnetic body of the present invention having negatively charged metal layers and inward force field direction would produce inward converged force lines and force fields when it is approached to a positively charged external substance having an outward force field direction, so that an electromagnetic phenomenon is formed and a radial magnetic field of force is produced. As a result, the radial magnetic field of force produced by the magnetic body of the present invention in use has not fixed magnetic field direction and range, and accordingly, provides further enhanced magnetizing effect.

In a preferred embodiment of the present invention, three different metal elements are used to form three different metal layers, namely, a first or central metal layer formed from indium (In), a second metal layer formed from silver (Ag), and a third metal layer formed from aluminum (Al).

The insulating enclosure and the insulating layers are formed from general insulating substances, such as polyurethane (PU) rubber, polyvinyl chloride (PVC) resin, or polyethylene terephthalate (PET), and serve to isolate the negative charges of the metal layers, lest the magnetic body should become useless due to neutralization of the negative charges by external positive charges. However, the insulating enclosure and the insulating layers do not interrupt the effect of the magnetic field of force of the magnetic body.

The filter layers are of a mesh structure woven from an insulating material and having at least 144,000,000 meshes per square inch. The force lines of the electric charge field of force are transformed into a nanometer form when they pass through the extremely fine meshes of the filter layers.

The light-absorbing layer is a light-absorbing fabric capable of absorbing light energy. The absorbed light energy is stored in the light-absorbing layer to enhance the energy of electric charges and accordingly, the magnetizing power of the magnetic body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
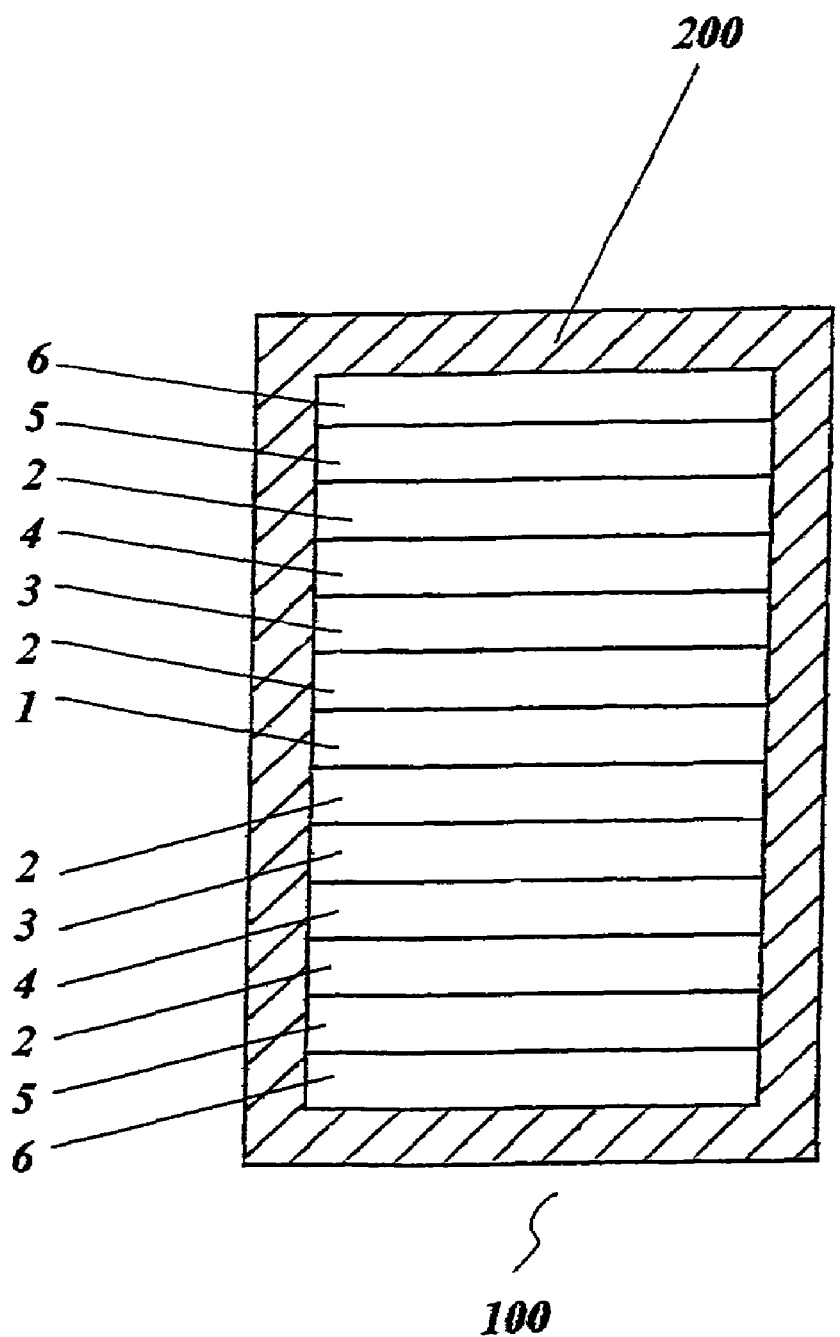
FIG. 1 is a cross-sectional view of a magnetic body according to a preferred embodiment of the present invention.

Please refer to FIG. 1 that is a cross-sectional view of a magnetic body 100 according to a preferred embodiment of the present invention. As shown, the magnetic body 100 includes a plurality of laminated inner layers fully enclosed in an insulating enclosure 200. It is to be noted all the accompanying drawings are enlarged, and an actual overall thickness of the illustrated embodiment of the present invention is only about 2 mm to 3 mm.

The laminated inner layers in the magnetic body 100 include a first metal layer 1 that is located at a center of the laminated inner layers and is therefore also referred to as a central metal layer 1 herein; two first insulating layers 2 separately located at an upper and a lower side of the central metal layer 1; two identical second metal layers 3 separately located at an outer side of the two first insulating layers 2; two mesh-structured filter layers 4 separately located at an outer side of the two second metal layers 3; two second insulating layers 2 separately located at an outer side of the two filter layers 4; two identical third metal layers 5 separately located at an outer side of the two second insulating layers 2; and two light-absorbing material layers 6 separately located at an outer side of the two identical third metal layers 5. All the laminated inner layers are then completely enclosed in the insulating enclosure 200 to form the magnetic body 100 of the present invention.

Figure 2:
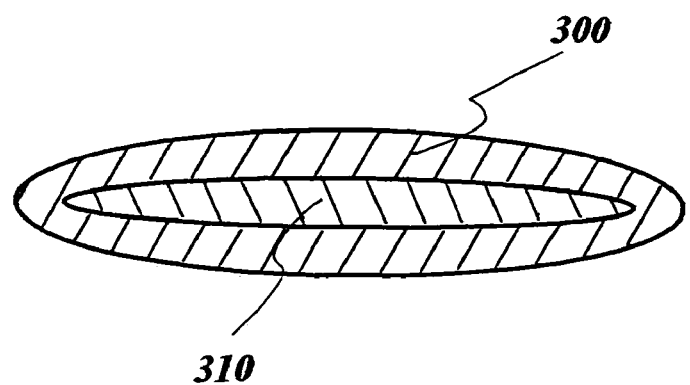
FIG. 2 is a cross-sectional view of a metal layer included in the magnetic body of the present invention.

Please refer to FIG. 2. The first, the second, and the third metal layers 1, 3, and 5 of the magnetic body 100 are made of an electrically conductive metal element 300, which is high-temperature vaporized and then coated on an entire surface of an insulating body 310 to form the metal layers 1, 3, and 5 that are negatively charged.

In the illustrated preferred embodiment, three different types of electrically conductive metal elements, namely, indium (In), silver (Ag), and aluminum (Al) are used to form the central, the second, and the third metal layers 1, 3, and 5, respectively. Through utilization of different charge numbers and charge densities of three different metal elements, radial magnetic fields of force of the first, the second, and the third metal layers 1, 3, and 5 are of highly complementary.

Since the metal elements of indium, silver, and aluminum have respective charge numbers, indium having the highest charge number is used in the present invention to form the central metal layer 1, and silver and aluminum having the next highest and the lowest charge number are used to form the second and the third metal layers 3 and 5, respectively. It is noted two identical second metal layers 3 and two identical third metal layers 5 are provided to separately locate at an upper and a lower position in the magnetic body 100, so that the radial magnetic fields of force of these metal layers have complementary densities and effects.

Figure 3:
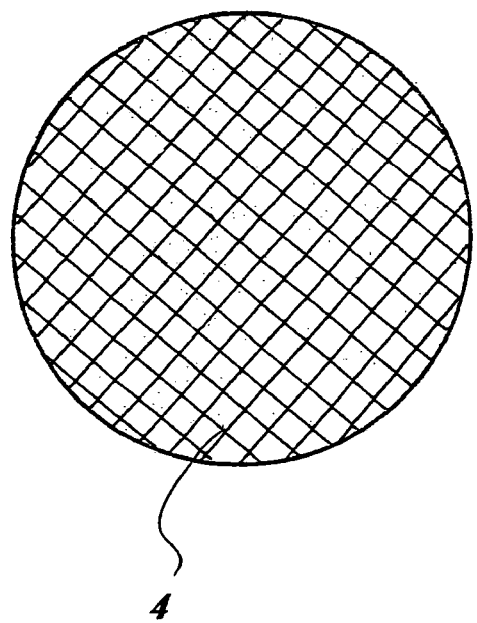
FIG. 3 schematically shows the mesh structure of a filter layer included in the magnetic body of the present invention.

FIG. 3 shows the mesh-structured filter layer 4 included in the magnetic body 100 of the present invention. The filter layer 4 is a mesh structure woven from an insulating material and having at least 144,000,000 meshes/square inch. Force lines of electric charges passing through these highly fine meshes are transformed into an extremely fine nanometer form, which has been experimentally proven to act wider and farther, and last longer.

The light-absorbing material layer 6 in the magnetic body 100 is a fabric capable of absorbing light energy. With the light energy pre-absorbed by and stored in the light-absorbing material layers 6, the magnetic body 100 has further enhanced energy of electric charges.

The insulating layers 2 and the insulating enclosure 200 are formed from general insulating substances, such as polyurethane (PU) rubber, polyvinyl chloride (PVC) resin, or polyethylene terephthalate (PET), and serve to isolate the negative charges of the metal layers 1, 3, and 5, lest they should be neutralized by external positive charges.

When the magnetic body 100 is approached to an external positively charged substance or article, it cooperates with north and south poles to produce a radial magnetic field of force and inward converged force lines. That is, unlike the traditional magnetic field produced by a magnet, the radial magnetic field of force produced by the magnetic body 100 is not limited to fixed direction and range, and accordingly, provides further enhanced magnetizing effect. In other words, the magnetic body 100 produces a radial magnetic field of force having an even better magnetizing effect as compared to the traditional magnetic lines that have limited directions and ranges between north and south poles.

When the magnetic body 100 of the present invention is used to magnetize water, the water molecular structure and physical properties are changed, and big molecular groups of the tap water are split into small molecular groups to improve the activity of water molecules, making the water taste better and have increased solvency and permeating ability for nutrient substances to more easily pass through the cell wall to complete the metabolism in human body.

When the magnetic body 100 of the present invention is used to magnetize liquor, the liquor is changed in its properties and taste better.

When the magnetic body 100 of the present invention is used in different applications of electric energy, it magnetizes and rearranges the molecules at the surfaces of metal parts, such as conducting wires, battery plate electrodes, etc., so that the metal parts have lowered resistance and enhanced conductivity to enable largely increased power.

When the magnetic body 100 of the present invention is used with fuels, it magnetizes, rearranges, and reduces the size of the fuel molecules to enable more complete combustion of the fuel to achieve the purpose of saving energy and enhancing fuel performance.

When the magnetic body 100 of the present invention is used with apparel, shoes, etc., or closely worn on a user's body, the magnetizing effect provided by its electric charges purifies the user's body magnetic field, activates the user's tissue cells, and improves the user's blood circulation.

It is to be particularly emphasized that the magnetic body 100 has radial magnetic lines that are not restricted to any definite direction and range, and can therefore be used without being limited to any specific direction or spatial size. In other words, when the magnetic body 100 is approached to, mounted on, disposed along with anything to be magnetized, such as gas, liquid, a solid body, or a given space, in any manner, the radial magnetic field of force and the magnetic lines produced by the magnetic body 100 are always effective. The magnetic body 100 is therefore extremely convenient and easy for use as compared to conventional magnets.

The effects of the above-mentioned examples of using the magnetic body 100 of the present invention with water, fuel, cells of living organism, etc. have been tested and proven by many public-recognized authorities.

It is understood the scope and the spirit of the present invention is to be limited only by the appended claims without being restricted by the above-mentioned examples.

In conclusion, the present invention employs the principles of natural electromagnetic phenomenon resulted from electric charges to produce magnetic force, static magnetic field of force, etc., which have better durability, and wider range and application than the traditionally produced magnetic force and static electricity.

What is claimed is:

1. A magnetic body, comprising a plurality of laminated inner layers and an insulating enclosure fully enclosing said inner layers therein; said inner layers including a plurality of metal layers, a plurality of insulting layers, a plurality of filter layers, and a plurality of fabric material layers; said magnetic body being characterized in that each of said plurality of metal layers being formed by coating a specific electrically conductive metal element with vapor deposition on an entire surface of an insulating body to provide a negative charge thereof; that said insulating layers being made of an insulating substance; said filter layers being formed of a mesh structure woven from an insulating material; and a first of said plurality of metal layers being located at a center of said magnetic body and formed with said conductive metal being indium, and each of an upper and a lower side of said central metal layer being laminated with a respective first of said insulating layers; each of said first insulating layers being overlaid by a respective second of said plurality of said metal layers each second metal layer being formed with said conductive metal being silver; each of said second metal layers being overlaid by a respective one of said filter layers, each of said filter layers being overlaid by a respective second of said insulating layers; each of said second insulating layers being overlaid by a respective third of said plurality metal layers, each third metal layer being formed with said conductive metal being aluminum; each of said third metal layers being overlaid by a respective one of said fabric material layers such that said plurality of metal layers are electrically isolated from one another by said insulating layers to avoid neutralization of negative charges of said metal layers by external positive charges.

2. The magnetic body as claimed in claim 1, wherein said insulating enclosure and said insulating layers are made of an insulating material selected from the group consisting of PU rubber, PVC resin, and PET.

* * * * *